United States Patent [19]

Barnes et al.

[11] 3,750,124
[45] July 31, 1973

[54] FLUID LEVEL SWITCH
[75] Inventors: Charles M. Barnes; Raymond Kosaeski, Jr., both of St. Joseph, Mich.; James B. Putt, South Bend, Ind.
[73] Assignee: The Bendix Corporation, South Bend, Ind.
[22] Filed: Sept. 20, 1971
[21] Appl. No.: 181,699

[52] U.S. Cl. .............. 340/244 E, 200/84 C, 340/59
[51] Int. Cl. ............................................. B60t 17/22
[58] Field of Search .................... 340/244 A, 244 B, 340/244 E, 59; 200/84 C

[56] References Cited
UNITED STATES PATENTS
3,633,193 1/1972 Milo ............................. 340/244 A
3,603,925 9/1971 Hughes et al. .............. 340/244 E X
3,471,665 10/1969 Sargent ............................. 200/84 C Primary Examiner—John W. Caldwell
Assistant Examiner—Daniel Myer
Attorney—Leo H. McCormick, Jr. et al.

[57] ABSTRACT

An indicator for warning of low fluid level in a master cylinder reservoir having an electrical reed switch mounted horizontally in the wall of a fluid reservoir and connected to appropriate indicator circuitry for warning the vehicle operator of the low fluid condition. The reed switch is actuated by a permanent magnet encapsulated in a float whenever the fluid level becomes dangerously low.

6 Claims, 12 Drawing Figures

INVENTORS
CHARLES M. BARNES
RAYMOND KOSARSKI, JR.
BY JAMES B. PUTT

ATTORNEY

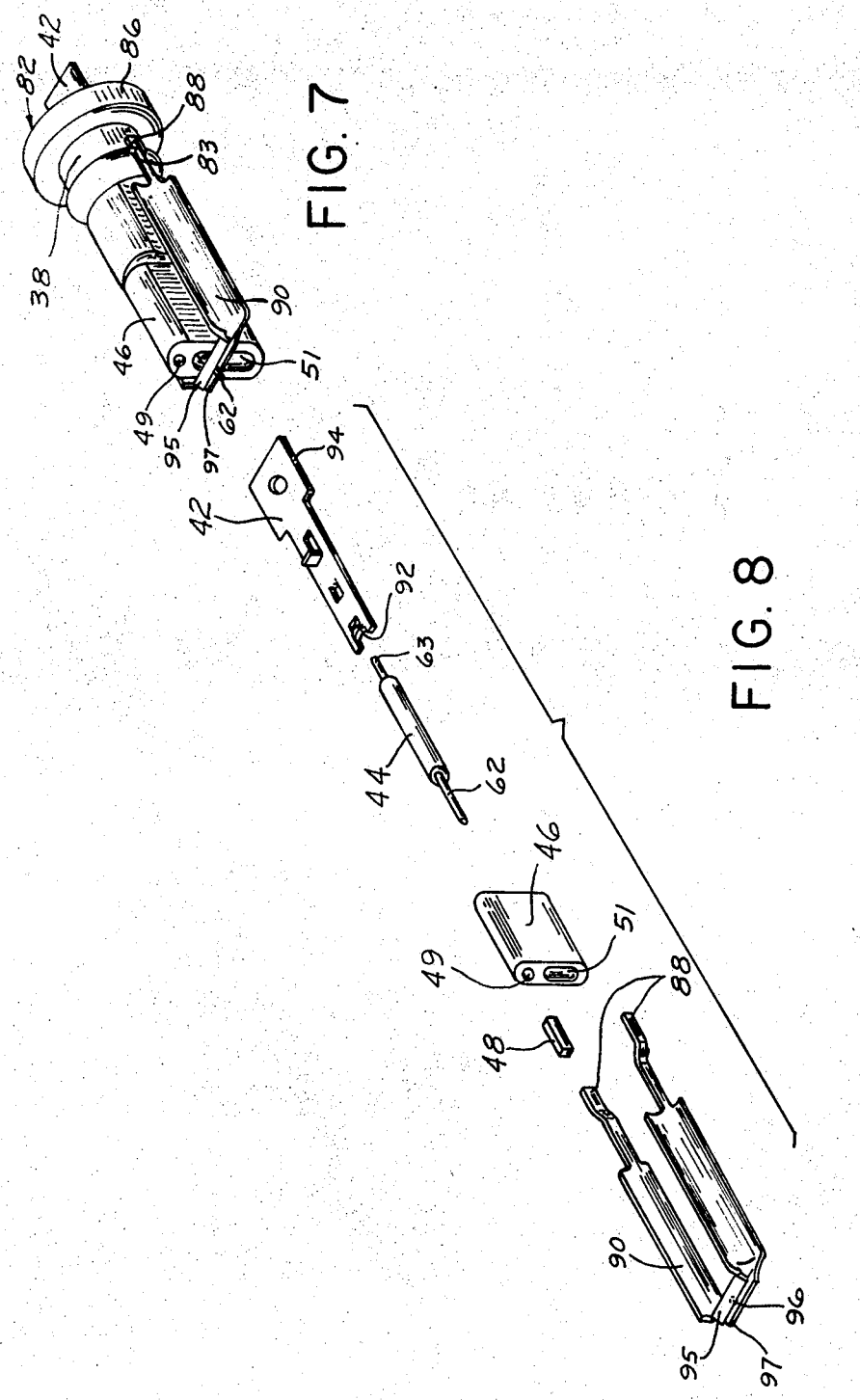

INVENTOR.
CHARLES M. BARNES
RAYMOND KOSARSKI, JR.
BY JAMES B. PUTT

Leo H. McCormick Jr.
ATTORNEY

FLUID LEVEL SWITCH

BACKGROUND OF THE INVENTION

Many devices have been conceived for warning the driver of a motor vehicle of a dangerously low hydraulic fluid level in the master cylinder reservoir for operating the brakes of the vehicle. These devices are very complicated, cumbersome and frequently expensive to manufacture. Furthermore, some of these devices lacked sufficient accuracy to indicate to the vehicle operator depletion of brake fluid caused by a leaking brake system prior to complete failure of the brakes.

Reed switches have been used in some known fluid level indicators. However, these reed switches are vertically mounted in the master cylinder by insertion through the cover. This creates the attendant necessity for providing an opening in the reservoir cover for insertion of either the switch itself or terminals of the switch to protrude therethrough. A magnet is required to operate the reed switch and usually has a circular shape with a hole through its center for acceptance of a reed switch probe. This annular magnet surrounding the reed switch probe, was often made of a very hard, brittle substance (i.e., such as Alnico 5) since a permanent independent magnetic field unaffected by outside electrical actuation was desired. However, the machining of this material is very difficult and consequently, a very expensive magnet is produced.

The present invention overcomes both these deficiencies in that the switch is horizontally disposed in the side of a master cylinder reservoir or other fluid reservoir and the magnet is a simple, non-critical shape.

SUMMARY OF THE INVENTION

It is a primary object of this invention to provide a simplified warning system having a hermetically sealed switch that is actuatable by magnetic means sensitive to the level of fluid within a brake system reservoir.

It is another object to provide a warning switch which is unobstrusively mounted through the side of a fluid reservoir to eliminate interference with the reservoir cover.

Still another object of this invention is to provide an encapsulated magnetic actuation element mounted on a float to close a reed switch when a fluid level brings the float adjacent the reed switch.

An important object of the invention is to provide a fluid level switch which can easily be converted from a normally open to a normally closed operation and vice versa depending upon the electrical circuit used to transmit a signal from the switch to an indicator.

DESCRIPTION OF THE DRAWINGS

FIG. 7 is a perspective view of another switching apparatus similar to that of FIG. 2 having a removable grounded guide to selectively permit the normally open reed switch to be converted to a normally closed reed switch;

FIG. 8 is an exploded view of the reed switch, float, magnet and contacts for use in the embodiment of FIG. 7;

DETAILED DESCRIPTION OF THE PREFERRED EMBODIMENT

Figure 1:
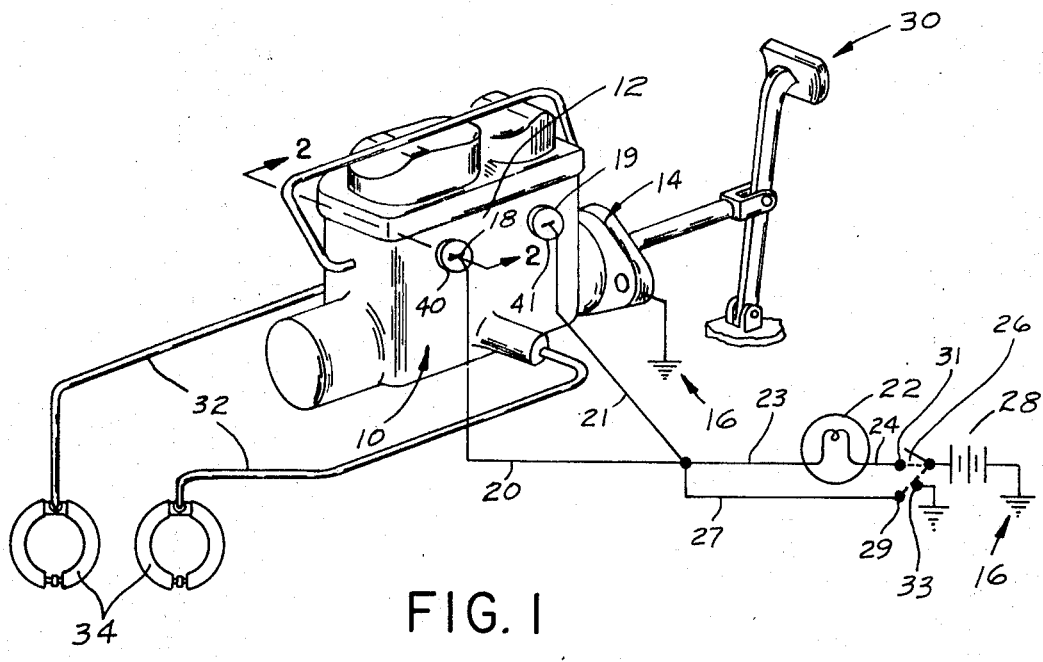
FIG. 1 illustrates our switching apparatus mounted in a side wall of a master cylinder hydraulic fluid reservoir with suitable electrical circuitry required to convey a warning signal to an indicator to inform an operator of a fluid level in the master cylinder.

A manually activated split master cylinder 10 of a type fully described in U. S. Pat. No. 3,149,468, and incorporated herein by reference is shown in FIG. 1. The master cylinder 10 has a mounting bracket 14 for positioning in a suitable location in a vehicle. When mounting bracket 14 is secured to the vehicle, an electrical ground will be created for the fluid level switches 18 and 19. Fluid level switch 18 being located in the front reservoir 59, see FIG. 2, and fluid level switch 19 being located in the rear reservoir, not shown, of the master cylinder 10, the fluid level switches 18 and 19 are disposed horizontally through holes 40 and 41, respectively in a side wall 12 of the master cylinder. Positive leads 20 and 21 appropriately connected to the fluid level switches 18 and 19 are tied to a single lead 23 going to an indicator 22. The indicator 22 is connected to the ignition switch 26 by lead 24. Upon closing the ignition switch 26, electrical energy from electrical power supply 28, usually a battery, is available to operate the indicator 22 in response to a positive signal being transmitted from either fluid level switch 18 or 19.

Figure 2:
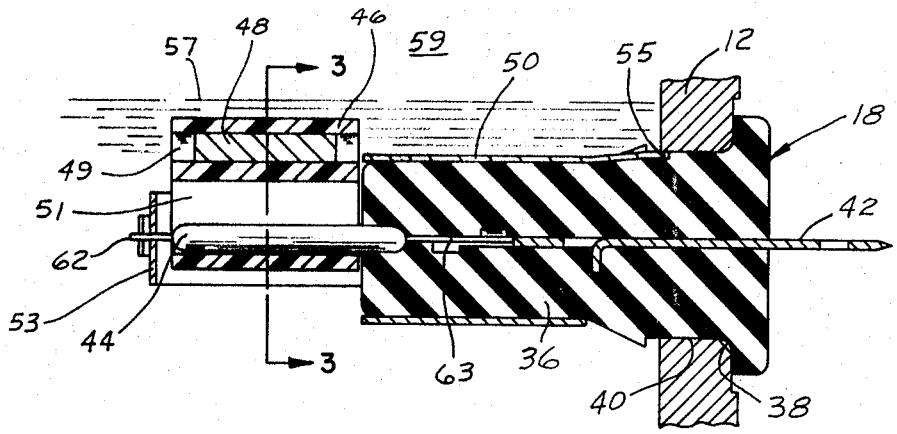
FIG. 2 is a sectional view taken along lines 2—2 of FIG. 1 showing the switching apparatus with a magnet carried by a float for maintaining a reed switch in an open position and a single terminal passing through a wall of the master cylinder for carrying a positive signal to the indicator.

Since the fluid level switches 18 and 19 are identical, particular detailed reference for fluid level switch 18 in FIG. 2 could equally apply to fluid level switch 19.

Figure 3:
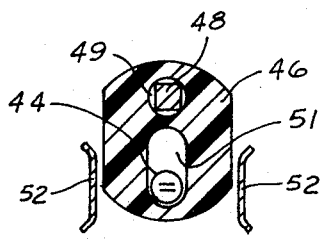
FIG. 3 is a sectional view taken along lines 3—3 of FIG. 2 showing a magnet mounted above an elongated slot which retains an encapsulated reed switch.

The fluid level switch 18 in FIG. 2 consists of a resilient body or probe 36 having a groove 38 for retaining switch 18 in hole 40 in the wall 12 of the master cylinder 10. A positive terminal 42 located in the resilient body 36 has one end connected to lead 20 going to the indicator 22 and the other end connected to lead 63 going to an encapsulated reed switch 44. An electrically conductive arcuate shield 50 which surrounds the resilient body 36 has a pair of legs 52 connected to an end cap 53. The end cap 53 is connected to lead 62 to provide electrical continuity between the reed switch 44 and the wall 12 through contact 55. Float means 46 located between the resilient body 36 and the end cap 53 has an elongated slot 51. The reed switch 44, as shoen in FIG. 3, is located in the elongated slot 51. A magnet 48 is located in a mounting hole 49 adjacent the elongated slot 51. The elongated slot 51 will permit float means 46 to move the magnet 48 vertically with respect to the fixed position reed switch 44. As the float means 46 moves in response to the level of the fluid 57 in the reservoir 59, the legs 52 of the shield 50 which surrounds float means 46 acts as a guide to maintain a general vertical alignment between the magnet 48 and the reed switch 44.

Figure 6:
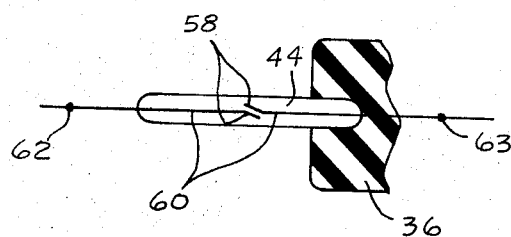
FIG. 6 is a sectional view of a hermetically encapsulated reed switch.

The reed switch 44 as shown in FIG. 6 is positioned in the resilient body 36 in such a manner that when the reed elements 60 are placed in a magnetic field, they attract one another and close the contacts 58. With contacts 58 closed, electrical continuity in the circuit leading to the indicator is established.

To test the operativeness of the indicator 22, a test circuit 27 is connected to a terminal 29, which is closed in the start position of the ignition switch 26. In moving the switch 26 to the run position 31, electrical energy is transmitted to the indicator 22. Upon further movement of switch 26 to the start position, the blade closes a circuit between a ground 33 and terminal 29 to complete the test circuit, causing indicator 22 to be energized during the period when the switch 26 is in the start position.

MODE OF OPERATION OF THE PREFERRED EMBODIMENT

Each time the brake pedal 30 is depressed to cause a piston means (not shown) in the master cylinder 10 to move, a certain amount of pressurized hydraulic fluid is displaced into line 32 to operate the individual wheel brakes 34. If any of this hydraulic fluid is lost, due to leakage, a smaller amount of hydraulic fluid is returned to the master cylinder 10 upon release of the pedal 30. This loss of hydraulic fluid causes the fluid level 57 in the front reservoir 59 and/or the rear reservoir (not shown) to drop with each successive brake application. Float means 46 holds magnet 48 away from the top of reed switch 44 as long as the level of the fluid 57 remains above the conductive arcuate shield 50. In this position the reed elements 60 will repel each other. With the reed element 60 repelling each other, the contacts 58 on each end of the reed will be opened.

As the fluid 57 in reservoir 59 is depleted through leakage to a level below the top of the arcuate shield 50, float means 46 will correspondingly move. Movement of the magnet 48 in float means 46 towards the reed switch 44 will increase the influence of the magnetic field of the magnet 48 on the reed elements 60 to a point that the contacts 58 will of their own design be closed. With contacts 58 closed, the electrical circuit between the grounded master cylinder 10 and the indicator 22 will be activated to continuously alert an operator of a low fluid level condition in the master cylinder 10.

Although a visual indicator 22, such as a light bulb, is shown, a gauge or audible indicating means such as a bell or buzzer could just as readily transform the low fluid level signal from the switching means 18 into a warning for an operator.

As soon as the fluid level in reservoir 59 is restored to a position above the arcuate shield 50, the float means 46 will be guided by legs 52 to position magnet 48 away from the reed switch 44. With the reed switch 44 again out of the influence of the magnetic field of magnet 48, contacts 58 on reed elements 60 will separate to open the electrical circuit and de-energize the indicator 22.

Throughout the remainder of the specification wherein like elements are used in the other embodiments, they will be designated with the same numeral.

Figure 4:
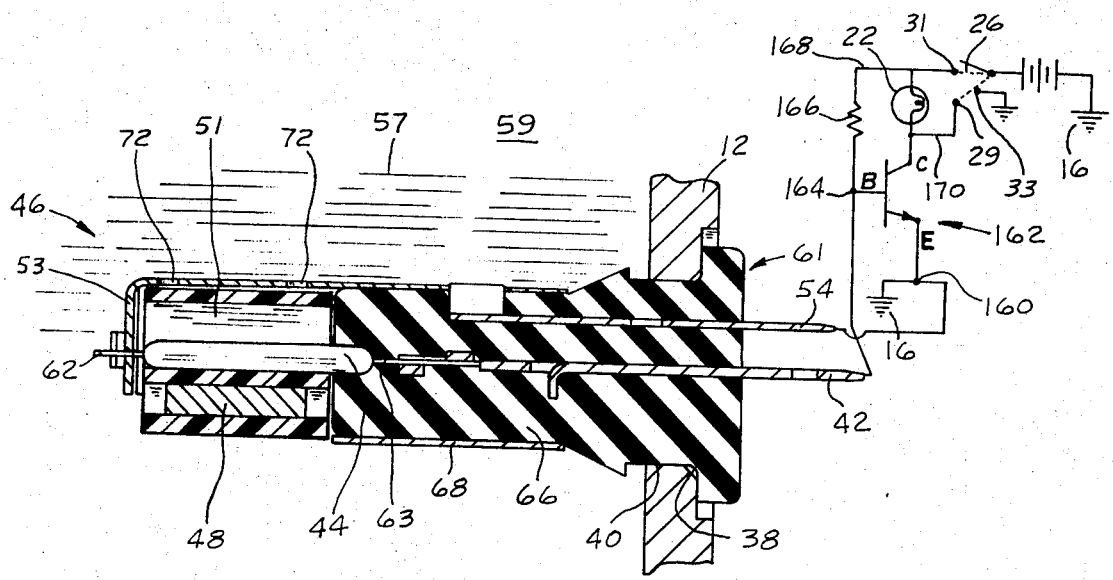
FIG. 4 is a sectional view of another embodiment or our switching apparatus having a plurality of terminals extending through the master cylinder to permit several switching apparatuses to be operated in series.

The embodiment shown in FIG. 4 consists of a resilient body 66 surrounded by an arcuate shield 68. The arcuate shield 68 extends beyond the resilient body 36 to form a protective cover 70 over the float means 46. The reservoir 70 is opened at the top and the cover 70 has a plurality of openings 72 along the top to permit flow of fluid 57 into and around the float means 46 as the level of fluid 57 drops below the top of end cap 53. End cap 53 is electrically connected to lead 62 going to the reed switch 44. The arcuate shield 68 is also conductive and can carry a signal from the reed switch 44 to a ground terminal 54 located in the interior of the resilient body 36 adjacent the positive terminal 42.

By carrying the ground terminal 54 through the resilient body 36, to prevent grounding by the wall 12 of the master cylinder 10, fluid level switch 61 can be placed in series with other electrically operated devices. The float means 46 is the same as that used with the embodiment of FIG. 2. The reed switch 44 will be the same as that shown in FIG. 6 but the electric circuit going to the indicator 22 will need to be redesigned as follows:

Ground terminal 54 is connected to lead 160 going from the emitter E, of an NPN transistor 162, to ground 16. The positive terminal 42 is connected to the lead 164 coming from resistor 166 going to base B of the NPN transistor 162. The resistor 166 is connected through lead 168 to the run position terminal 31 of the switch 26. The indicator 22 is connected through lead 168 to the run position terminal 31 of the switch 26. The indicator 22 is connected to lead 168 and the collector C of the NPN transistor 162. When the level of fluid 57 in the reservoir 59 is sufficient to maintain float means 46 in the position shown in FIG. 4, the reed elements 60 will attract one another and contact 58 will be closed. With reed switch 44 closed, no signal will be transmitted to the indicator 22 since the emitter E and base B have the same electrical flow potential. This same flow potential results since the base B is connected to ground 16 by lead 164, terminal 54, closed reed switch 44, terminal 42 and lead 160. As the fluid level drops due to depletion from leakage, magnet 48 will move away from the reed switch 44. When magnet 48 is positioned away from the reed switch 44, its magnetic field will cease to influence the reed elements 60, allowing the contacts 58 to repel one another and open. With contacts 58 opened, current will flow through base B to emitter E to turn on the NPN transistor Correspondingly, current will flow through indicator 22 through collector C to base B to energize indicator 22 to alert the operator of a low fluid level in the reservoir 59 of the master cylinder 10.

A test circuit having lead 170 connected to the emitter E will be energized when switch 26 is in the start position 29 to check the operativeness of indicator 22. In the start position 29 electrical current will flow through the run position terminal 31 to energize indicator 22 and back to the grounded start terminal to complete the test circuit.

Figure 5:
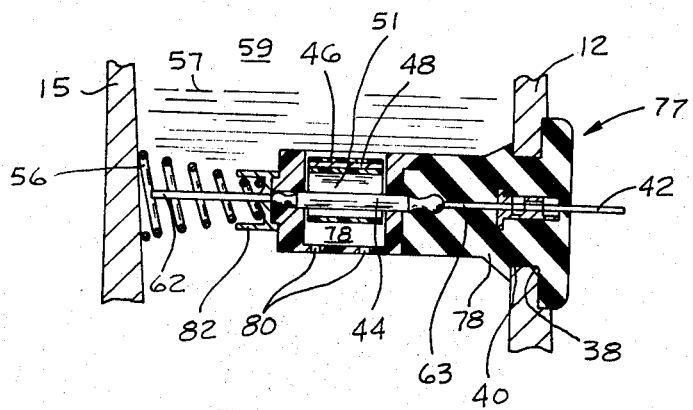
FIG. 5 is a sectional view of another switching apparatus having resilient means located between a reed switch and an opposite wall of the master cylinder.

The embodiment of the fluid level switch 77 shown in FIG. 5, consists of a resilient body 76 having a fluid level reservoir 78. The fluid level reservoir 78 is opened at the top and has a plurality of openings 80 along the bottom to allow the fluid level in reservoir 78 to follow that in reservoir 59. The reed switch 44 being the normally open type as described with reference to FIG. 4 is located in the fluid level reservoir 78 and is surrounded by float means 46. The lead 63 of the reed switch is connected to a resilient means 56 which is biased between wall 15 of the master cylinder and a retainer 82 attached to the resilient body 76. The operation of the reed switch 44 is exactly the same as that in FIG. 2 above, as the magnet 48 approaches reed switch 44, the reed elements 60 will attract one another and close contacts 58 to permit a current to be transmitted to operate indicator 22. When indicator 22 is energized, the operator will be informed of a low fluid level condition in the master cylinder 10.

The embodiment of the fluid level switch 82 shown in FIG. 7 consists of a resilient electrical non-conductive body or probe 86 with a single positive terminal 42. The positive terminal 42 has a biasing clip 92, as shown in FIG. 8 on one end and spade-like head 94 on the other end. An electrically conductive U-shaped guide 90 has a central opening 96 into which lead 63 from the reed switch 44 is resiliently retained by prongs 95 and 97. Float means 46 with magnet 48 positioned in hole 49 is slid on the reed switch 44 and the ends 88 of the U-shaped guide pushed into notch 83 on the non-conductive body 86. At the same time lead 62 from the reed switch is joined to biasing clip 92. Upon insertion of the fluid level switch 82 into an opening in the wall of a master cylinder 10 the resiliency of the groove 38 of non-conductive body 86 will urge ends 88 into an electrically grounded condition. This fluid level switch 82 can be converted from a normally opened reed switch to a normally closed reed switch, or vice versa, merely by rotating the location of the float means 46 180° and changing the electrical circuit used in the embodiment of FIG. 2 or 4.

Figure 9:
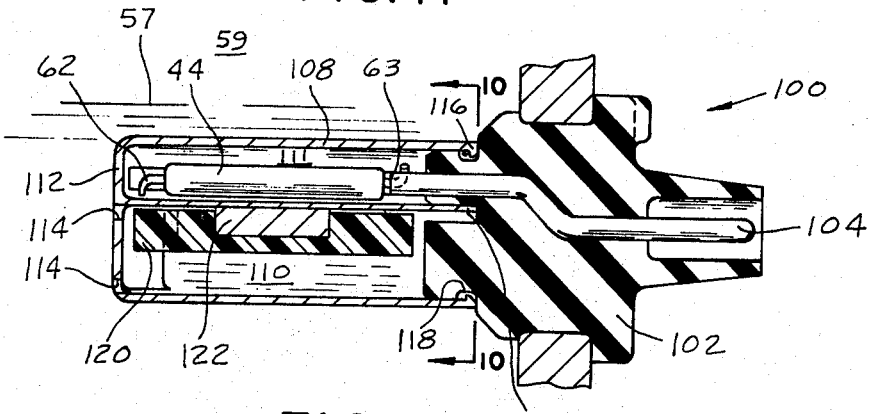
FIG. 9 is a sectional view of another switching apparatus having an enclosed closed reed switch.
Figure 10:
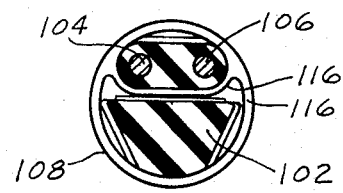
FIG. 10 is a sectional view along line 10—10 of FIG. 9.

The embodiment of the fluid level switch 100 shown in FIG. 9 consisting of an electrically non-conductive body or probe 102 with a positive terminal 104 connected to lead 63 going to the reed switch 44 and a negative terminal 106, see FIG. 10, connected to lead 62 coming from the reed switch 44. An annular non-conductive protective covering 108 is separated into a fluid level chamber 110 and a reed switch chamber 111. The annular non-conductive covering 108 has an end cap 112 on one end with a plurality of openings 114 into the fluid level chamber 110 and a series of annular ribs 116 on the other end. The annular ribs 116 snap into a corresponding groove 118 on the non-conductive body 102 to seal the reed switch chamber 111 and prevent any electrical current leakage into the fluid in the reservoir, and reduce the effect of sloshing of the fluid in the master cylinder affecting the fluid level in chamber 110. A wafer type float 120 with a centrally positioned magnet 122 is placed in the fluid level chamber 110. As shown in the drawing of FIG. 9, when there is sufficient fluid in the reservoir 59, float 120 will position the magnet 122 adjacent the reed switch 44. The reed switch being oriented to be such that the reed elements 60 attract each other under the influence of the magnetic field from magnet 122. If the fluid level 57 drops in the reservoir 59 sufficiently, a corresponding drop will occur in the fluid level chamber 110 which will move magnet 122 away from the reed switch 44 as the float 120 moves. When magnet 122 has moved a sufficient distance away from the reed switch, the reed elements 60 will be allowed to repel each other and open contacts 58 permitting a signal to be transmitted to the indicator 22 through the switching transistor 162. This fluid level switch 100, similar to switch 61, can be utilized in either the electrical circuit shown in FIG. 2 or FIG. 4 by rotating the non-conductive body 102 in the mounting hole in the master cylinder.

Figure 11:
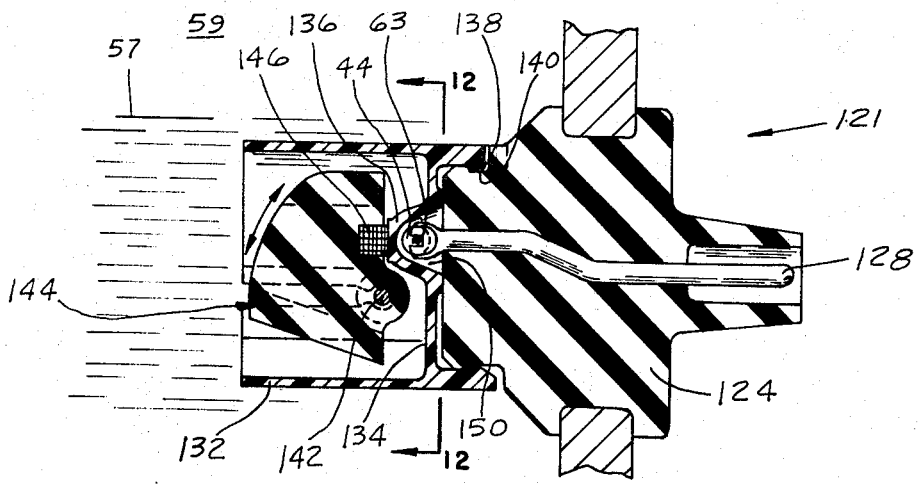
FIG. 11 is a sectional view of another switching apparatus having a pivotally held magnetic float means for activating the reed switch.
Figure 12:
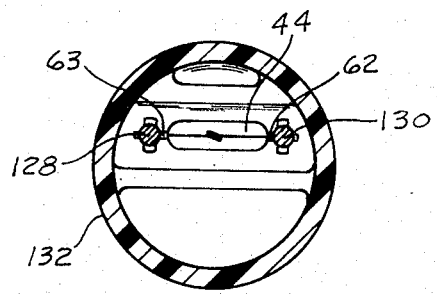
FIG. 12 is a sectional view along line 12—12 of FIG. 11.

The embodiment of the fluid level switch 121 shown in FIG. 11 consists of an electrically non-conductive body 124 having a positive terminal 128 connected to lead 63 going to a perpendicular position reed switch 44, see FIG. 12 and a negative terminal 130 connected to lead 62 from reed switch 44. An annular protective tubular member 132 has an internal wall 134 with an indentation 136. An annular rib 138 on the tubular member 132 snaps into a corresponding groove 140 on body 126 with the indentation surrounding the reed switch 44. With rib 138 snapped into groove 140, reed switch 44 is sealed into a section 150 away from the fluid 57 to reduce the possibility of any electrical energy leakage to the fluid. A pivot pin 142 extends through the tubular member 132 adjacent indentation 136 in wall 134. Float means 144, located on the pivot pin 142, has a magnet 146 which is positionable into an abutting relationship with indentation 136. When there is sufficient fluid in the reservoir the float means 144 will position magnet 146 against indentation 136 causing the reed elements 60 in reed switch 44 to attract each other under the influence of the magnetic field from magnet 146 and maintain the transistor 162 shown in FIG. 4 in an off position. When the fluid level drops, float means 144 will pivot on pin 142, causing magnet 146 to move away from reed switch 44 permitting the reed elements 60 to open contacts 58 and switching transistor 162 on closing the circuit to indicator 22 to inform the operator of a low fluid condition. With this pivotal float 144, the fluid level switch 124 could be located in either the top or the side of the master cylinder and function equally well.

We claim:
1. In a master cylinder:
  a housing having a reservoir therein containing a fluid, said fluid being subjected to sloshing;
  switch means having one end fixed in a side of said housing and the other end extending into said reservoir, said switch means having a pair of contacts movable from a non-actuated position to an actuated position;
  a source of electrical energy connected to said switch means;
  float means having a transverse slot surrounding said switch means and a transverse hold adjacent said transverse slot, said transverse slot being elongated in a vertical direction for permitting vertical movement of the float means relative to the switch means in response to changes in the level of the fluid in said reservoir;
  cover means for enclosing said float means to form a fluid level indicator chamber, said cover means having a portion thereof cut away to a predetermined opening size to permit fluid communication between said reservoir and indicator chamber, saidopening in the cover means attenuating the effect of sloshing of said fluid in said reservoir by controlling the fluid flow communication into said indicator means, said cover means having a first leg and a second leg extending parallel to the transverse slot and an end cap connecting the first leg with the second leg, said end cap holding said other end of the switching means in a fixed position with respect to said cover means, said first and second legs guiding said float means in the reservoir to maintain the transverse slot and hole in the float means in a vertical position;

indicator means for informing an operator of a predetermined fluid level in said reservoir;

electrical circuit means connecting said source of electrical energy with said indicator means through one end of the switch means, the other end of said switch means, said end cap, and first and second legs; and magnetic means located in said transverse hole in said float means for actuating said switch means in response to a predetermined vertical position of said float means in said reservoir, said switch means upon actuation permitting said electrical energy from said source to flow and energize said indicator.

2. The invention of claim 1 wherein said switch means includes:

a hermetic, non-conductive, non-magnetic tube having a pair of magnetic contact elements extending longitudinally inwardly from the respective ends of said tube with normally overlapping end portions adapted to be moved by said magnetic means from a non-actuated position to an actuated position;

electrical lead means connected to the respective ends of said magnetic contact elements and extending through said tube at either end;

terminal blades attached to the respective outer ends of said leads and disposed for external connection of said switch means to said electrical circuit means; and a resilient body within which said tube, a portion of said leads and a portion of said terminal blades are encapsulated.

3. The invention of claim 2 wherein said overlapping end portions of the contact elements are normally resiliently spaced and are adapted to be drawn into contact by said magnetic means.

4. The invention of claim 2 wherein said overlapping end portions of the contact elements are normally in contact and are adapted to be drawn apart by said magnetic means.

5. The invention as recited in claim 2 wherein said switch means is sealed from said fluid to prevent leakage of electrical energy through said fluid.

6. The invention as recited in claim 2 wherein said float means is pivotally retained adjacent said switch means to correspondingly move said magnetic means with changes in the fluid level.

* * * * *